March 30, 1943.  J. B. BAMBENEK ET AL  2,315,387
CARRIER ATTACHMENT FOR VEHICLES
Filed April 8, 1940  2 Sheets-Sheet 1

Inventors
Joseph B. Bambenek
William F. Hein
Peter Worner
By Michant & Michant
Attorneys March 30, 1943.  J. B. BAMBENEK ET AL  2,315,387
CARRIER ATTACHMENT FOR VEHICLES.
Filed April 8, 1940  2 Sheets-Sheet 2
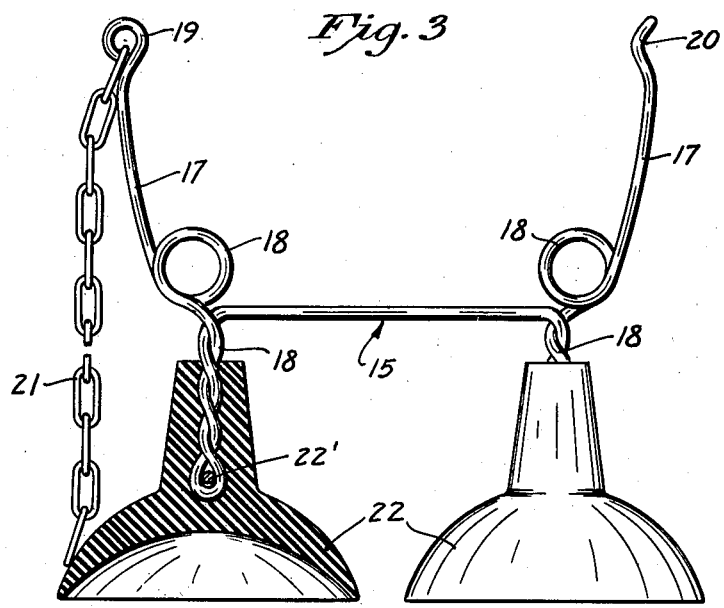
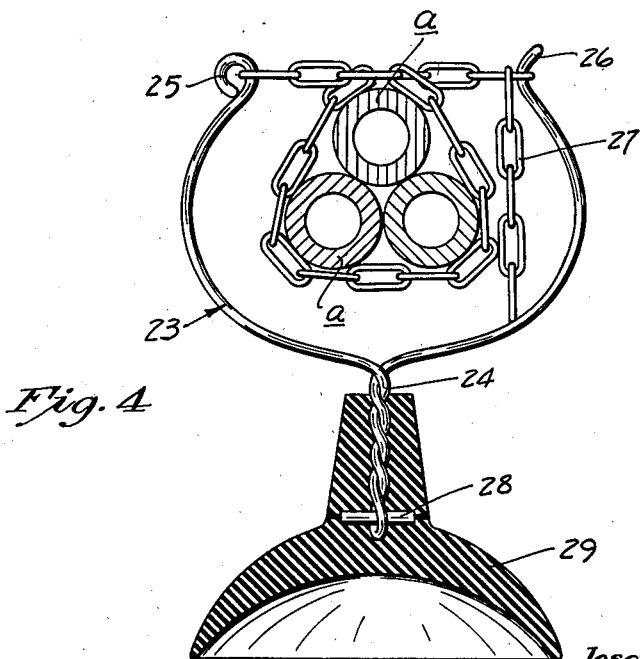
Inventors
Joseph B. Bambenek
William F. Hein
Peter Worner
By
Attorneys Patented Mar. 30, 1943

2,315,387

UNITED STATES PATENT OFFICE 2,315,387

CARRIER ATTACHMENT FOR VEHICLES

Joseph B. Bambenek, William F. Hein, and Peter Worner, Winona, Minn., assignors to Peerless Chain Company, Winona, Minn., a corporation of Minnesota Application April 8, 1940, Serial No. 328,496

4 Claims. (Cl. 224—29)

Our invention provides an extremely simple and highly efficient carrier attachment for automobiles and like vehicles, especially adapted for secure but detachable application to the top of an automobile for the purpose of carrying various articles such, for example, as a bundle of fish poles or a pair of skis.

For the carrying of long objects, such as fish poles and skis, a pair of the improved clamps should be applied, one to the front and rear portion of the automobile. The top of an automobile body is the most desirable place for the application of the carriers. The enclosed automobiles now manufactured are very generally provided with metal tops which afford smooth surfaces to which the carriers may be efficiently applied by means of vacuum cups.

The main objects of the invention, briefly stated, are efficiency in the carrying and holding operation, relatively low cost of production, durability, easy manipulation, and neatness in appearance. The carrier that we have produced fulfills all of these objects. The main elements of the carrier are a yoke of approximately or substantially U-shaped in general outline; a flexible and non-elastic cable, preferably a link chain; and anchoring shoes, preferably vacuum or suction cups. These elements, in accordance with our invention, are combined in a novel way.

The yoke, as preferably designed, is made from a single piece of heavy spring wire bent to form upstanding prongs. The chain is attached to one of the prongs and is detachably connectable to the other prong of the yoke and, as a highly important feature, this chain or cable is of a length that the intermediate portion thereof can be wrapped completely around objects, such as a bundle of fish poles or a pair of skis, and then attached to the resilient yoke in such way that the bundle of articles will be held in compact formation within the yoke.

The preferred form of the improved device and several modifications thereof are illustrated in the accompanying drawings wherein like characters indicate like parts throughout the several views.

Referring to the drawings:

Fig. 3 is a view corresponding to Fig. 2 but illustrating a slight modification of the carrier; and Fig. 4 is a view partly in elevation and partly in section illustrating a still further modification of the improved carrier.

Figure 1:
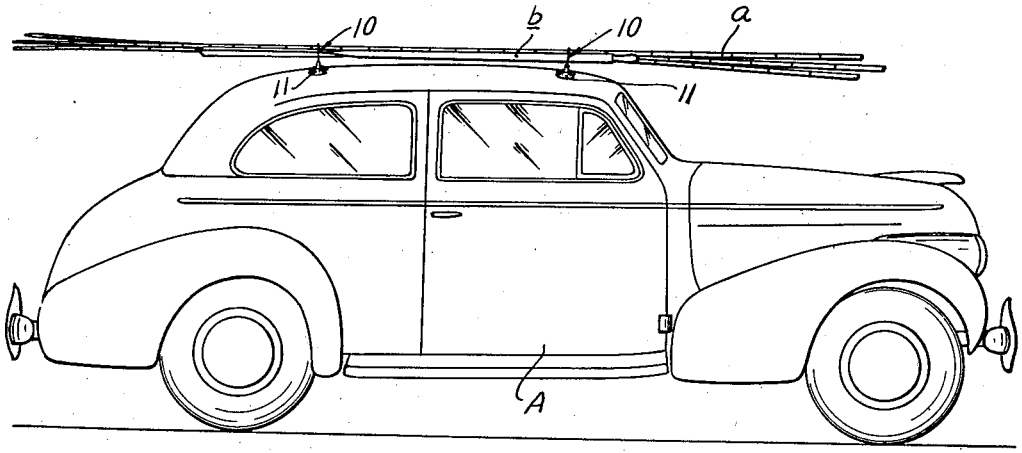
Fig. 1 is a side elevation showing the top of an automobile with a pair of the improved carriers applied thereto.
Figure 2:
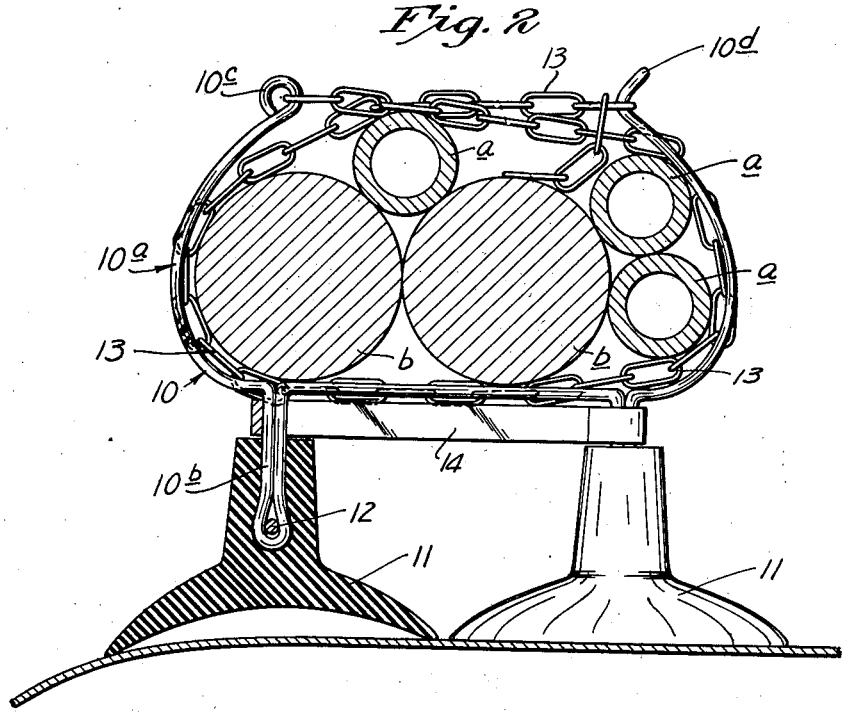
Fig. 2 is an elevation, with some parts sectioned, showing the preferred form of carrier and articles, such as a bundle of fish poles and a pair of oars, held thereby.

Describing first the preferred structure illustrated in Figs. 1 and 2, it will be noted that the yoke, indicated as an entirety by the numeral 10, is bent to form upstanding prongs 10a and depending laterally spaced legs 10b formed from a single piece of heavy spring steel wire. One of the upstanding spring arms 10a is formed with an eye 10c and the other spring arm is formed with a bent hook-forming portion 10d.

The legs 10b are frictionally pressed down into the axial passages formed in the upstanding hubs of rubber vacuum cups 11, which latter are or may be of well-known commercial form. Referring to the means for anchoring the legs in the hubs of the vacuum cups, pins or nails 12 may be driven through the hubs of the vacuum cups and through eyes formed in the lower ends of the legs.

The non-elastic but flexible cable which, as above stated, is preferably a chain 13, at one end is anchored in the eye 10c of the one spring arm and one of its links will be passed over the hook 10d of the other spring arm, after the intermediate portion of the chain has been wrapped about the fish poles, skis, or like objects to be carried. It will be noted that the chain is in length several times the distance between the spring prongs so that the intermediate portion of the chain can be wrapped about a bundle of fish poles, two or more skis, oars, or like objects. When such objects are contained within the loop of the chain and the chain is put under tension by the spring prongs, the said objects will be tightly pressed together and, moreover, will be held in a sort of a spring mounted cage, which will hold the said objects with a sort of cushion action preventing rubbing of the parts together and holding the poles or the like in suspension.

To rigidly space the depending legs and to render the base of the yoke rigid so that the yielding action will be all in the spring arms, a tie-bar or bridge 14, preferably of flat metal, is extended just below the base of the yoke and with its ends clinched about the upper portions of the legs just above the hubs of the vacuum cups.

The structure illustrated in Fig. 3 is very much like that just described. In this modified structure, the yoke is formed from a single piece of wire 15 bent to form legs 16, and upstanding spring arms 17 with loops 18. One of the arms 17 is provided with an eye 19 and the other with a hook end 20. Here the chain is indicated by the numeral 21 and the vacuum cups, into the hubs of which the twisted legs 16 are inserted, are indicated by the numeral 22 and secured by pin 22'.

In the modification illustrated in Fig. 4, the spring wire yoke 23 is formed with a single leg 24 and with upstanding spring arms, one of which is terminated in an eye 25 and the other of which is terminated in a hook 26. Here the chain is indicated by the numeral 27. The single leg or stem 24 is inserted into the hub of the vacuum cup 29 and is shown as further anchored by a pin 28 driven into the hub of the vacuum cup 29 and through the eye of the leg 24.

In Fig. 1 an automobile is indicated as an entirety by the character A. In Figs. 1, 2 and 4, the fish poles are indicated by the character a, and in Fig. 2, the oars are indicated by the character b. In said views Figs. 2 and 4, both the poles and the oars are shown in cross section.

The link chain is a flexible wrapper or holding means for the objects carried and has a great advantage over any other form of cable in that any link thereof is adapted for detachable application to the hooked end of the spring arm, thus adapting the chain to be attached and held under tension regardless of the amount of the intermediate portion thereof that is wrapped about the object or objects. The importance of the long cable or chain capable of being wrapped about objects such as indicated will be further emphasized by the fact that the objects thus wrapped by the cable or chain may be and usually will be held yieldingly in suspension above the base of the yoke, thereby producing the elastic or yielding manner of suspension indicated.

A preferred form of the invention and several modifications thereof have been illustrated and described, but it will, of course, be understood that various other changes and alterations may be made all within the scope of the invention herein disclosed and broadly, as well as specifically, claimed.

In applying the carriers to the top of an automobile, it is desirable to place the same at one side of the medial plane of the machine substantially as indicated in Fig. 1, but of course, the carriers can be applied in various other positions and, moreover, may be detachably otherwise secured to the top of the automobile by suitable means other than the vacuum or suction cups. Also, it is evident that the carriers may be used to carry various objects other than those above specifically mentioned. The carriers may even be made of the proper size and arrangement to carry canoes or small boats.

If the load of poles or the like held by the chains is heavy, the spring arms of the yoke will yield and the load will rest upon the bottom of the yoke. However, the clamping action on the load is not primarily a downward pressure and downward pressure toward the bottom of the yoke is not the force relied upon to hold the poles, oars, or the like in a bundle and properly carried.

Otherwise and more specifically stated, when the cable is applied around a number of objects or articles such as fish poles, skis or the like, and the chain is put under tension by the resilient arms of the yoke, the tension of the cable will hold the articles in compact assembly, will exert a suspending or upwardly lifting action on the same and, of course, the articles will be positively confined within the yoke. If the load of the articles embraced by the cable is not very great, the articles will be suspended, as shown in Fig. 4, but if the load is heavy, it will rest partly with some force on the bottom of the yoke. The upward pull or lifting action of the applied cable is due to the fact that the upper ends of the cable are attached to upper portions of the resilient arms. With this arrangement if in going over rough roads the embraced group of articles tend to heave upward, the cable will keep them in compact form even if they leave their contact with the bottom of the yoke and in no case will the cable lose its grip on the articles but will hold the same with a cushioning action.

What we claim is:

1. A carrier of the kind described involving a yoke having an anchoring base and upstanding resilient arms, and a flexible non-elastic cable anchored to the upper end of one of said arms and detachably securable to the upper end of the other of said arms, said cable being of such greater length than the distance between said arms, that the intermediate portion thereof can be wrapped completely around objects such as fish poles and skis, and in which structure the base thereof is formed by laterally spaced legs, vacuum cups applied to said legs, and a rigid tie-bar anchored to said depending legs below the bottom of the yoke and above the vacuum cups.

2. A carrier of the kind described involving a resilient yoke having an anchoring base and upstanding arms, and a flexible non-elastic cable anchored to the upper end of one of said arms and detachably securable to the upper end of the other of said arms, said cable being of such greater length than the distance between the arms, that the intermediate portion thereof can be wrapped completely around objects such as fish poles and skis and when so applied, will, under the spreading tendency of the arms of said yoke, tightly clamp together the embraced articles and exert upward lifting action thereon.

3. A carrier of the kind described, a yoke having an anchoring base and upstanding laterally spaced resilient arms, and a flexible non-elastic cable anchored to the upper end of one of said arms, and detachably securable to the upper end of the other said arms, said cable being of a length several times greater than the distance between the upper ends of said arms and of such greater length that the intermediate portion of said cable can be wrapped completely around objects such as fish poles, skis, and the like, thereby supporting such objects with an upward pull thereon, said anchoring base having means for detachably anchoring the same to an object such as the top of an automobile body.

4. The structure defined in claim 3 in which said non-elastic cable is a link chain, an end link of which is anchored to one of said arms and certain other links of which are adapted to be detachably interlocked with the upper end of the other arm of said yoke.

JOSEPH B. BAMBENEK.
WILLIAM F. HEIN.
PETER WORNER.